United States Patent
Fuerguth

(10) Patent No.: US 9,909,627 B2
(45) Date of Patent: Mar. 6, 2018

(54) METHOD FOR MANUFACTURING A SYNCHRONIZER RING AND SYNCHRONIZER RING FOR SYNCHRONIZED MANUAL TRANSMISSIONS

(71) Applicant: HOERBIGER Antriebstechnik Holding GmbH, Schongau (DE)

(72) Inventor: Werner Fuerguth, Biessenhofen/Altdorf (DE)

(73) Assignee: HOERBIGER Antriebstechnik Holding GmbH, Schongau (DE)

( * ) Notice: Subject to any disclaimer, the term of this patent is extended or adjusted under 35 U.S.C. 154(b) by 0 days.

(21) Appl. No.: 14/996,399

(22) Filed: Jan. 15, 2016

(65) Prior Publication Data

US 2017/0146074 A1    May 25, 2017

(30) Foreign Application Priority Data

Jan. 28, 2016   (DE) .................. 10 2015 100 869

(51) Int. Cl.
*F16D 23/02* (2006.01)
*B24B 1/04* (2006.01)
*F16D 69/00* (2006.01)

(52) U.S. Cl.
CPC ............. *F16D 23/025* (2013.01); *B24B 1/04* (2013.01); *F16D 2069/004* (2013.01); *F16D 2250/00* (2013.01); *F16D 2250/0023* (2013.01); *F16D 2250/0053* (2013.01); *F16D 2300/10* (2013.01)

(58) Field of Classification Search
CPC ........ F16D 23/025; F16D 23/02; F16D 23/06; F16D 2250/0053; B24B 1/04
See application file for complete search history.

(56) References Cited

U.S. PATENT DOCUMENTS 3,034,383 A * 5/1962 Schulte .................... B21K 1/30
                                                          72/359
4,770,283 A * 9/1988 Putz ....................... B21D 53/16
                                                       192/107 M (Continued)

FOREIGN PATENT DOCUMENTS

| DE | 3532672 A1 | 3/1986 |
| DE | 19548124 A1 | 6/1997 |

(Continued)

OTHER PUBLICATIONS

Partial English translation of Office Action and Search Report dated Feb. 4, 2016 issued by the German Patent Office in corresponding Application No. DE 10 2015 100 869.6, 5 pages.

(Continued)

*Primary Examiner* — Ramya P Burgess
*Assistant Examiner* — David R Morris
(74) *Attorney, Agent, or Firm* — Dilworth IP LLC

(57) ABSTRACT

A synchronizer ring (10) for synchronized manual transmissions is manufactured by forming or reshaping a flat material of metal, wherein a conical friction surface (20) is produced, into which axial grooves (24) are incorporated by chipless machining, wherein a tool is axially shifted relative to the friction surface (20) to produce the final friction surface (20). At least the friction surface (20) is vibration-ground and subsequently hardened.

16 Claims, 2 Drawing Sheets

(56) References Cited

U.S. PATENT DOCUMENTS

| | | | | |
|---|---|---|---|---|
| 5,105,522 A | * | 4/1992 | Gramberger | F16D 23/025 192/107 M |
| 5,918,718 A | | 7/1999 | Jahn et al. | |
| 5,968,604 A | | 10/1999 | Bischoff-Bogon et al. | |
| 6,588,563 B1 | | 7/2003 | Sarrach et al. | |
| 8,286,776 B2 | * | 10/2012 | Doernhoefer | F16D 23/025 192/107 R |
| 9,400,019 B2 | * | 7/2016 | Skipper | F16D 23/025 |
| 2016/0377125 A1 | * | 12/2016 | Christoffer | F16D 23/025 192/107 M |

FOREIGN PATENT DOCUMENTS

| | | |
|---|---|---|
| DE | 19858987 A1 | 6/2000 |
| DE | 19982494 C1 | 5/2003 |
| DE | 102004053000 B3 | 7/2006 |
| DE | 102006059868 A1 | 6/2008 |
| DE | 20091020882 A1 | 11/2010 |
| DE | 102011003555 A1 | 8/2012 |
| DE | 102011015836 A1 | 10/2012 |
| DE | 102012214025 A1 | 8/2013 |
| EP | 0818637 A1 | 1/1998 |
| EP | 1141567 B2 | 9/2010 |
| JP | H11 190362 A | 7/1999 |
| JP | 2006070953 A | 3/2006 |
| WO | 2010/130442 A2 | 11/2010 |

OTHER PUBLICATIONS

"Pulvermetallurgie", Chapter 8, p. 215-261, Springer Verlag Berlin Heidelberg, 2007, ISBN: 978-3-540-68112-0.

Notice of Opposition dated Sep. 12, 2017 issued by the German Patent Office in DE Application No. 102015100869.6, along with unofficial English summary, 28 pages.

* cited by examiner

METHOD FOR MANUFACTURING A SYNCHRONIZER RING AND SYNCHRONIZER RING FOR SYNCHRONIZED MANUAL TRANSMISSIONS

FIELD OF THE INVENTION

This invention relates to a method for manufacturing a synchronizer ring for synchronized manual transmissions, and a synchronizer ring for synchronized manual transmissions, which includes at least one conical friction surface with axially extending grooves incorporated by chipless forming and is hardened at least in the region of the friction surface.

In particular, this invention relates to a so-called blocker ring or blocking synchronizer ring for a manual transmission, whose blocking teeth temporarily prevent an engagement of the selector sleeve with the shifting teeth.

BACKGROUND

Synchronizer rings are used as external synchronizer rings, internal synchronizer rings and intermediate rings, wherein in addition a distinction also is made between single-, double- and triple-cone systems. The so-called multiple-cone systems often are used for synchronizing the low gears, as here the speed differences during synchronization are greater than in high gears and larger friction forces therefore are required when accelerating and braking the gearwheels. In an external synchronization the synchronizer ring has a conical outer shell and friction surface, and in an internal synchronization it has a conical inner shell and friction surface.

Synchronizer rings are manufactured for example by forming, i.e., reshaping, a sheet metal, by sintering or forging. The conical friction surface produced is machined in a succeeding working step, in particular coated with an organic or carbon-containing friction lining. Applying a metallic coating by means of galvanic or thermal methods also is possible.

A generic synchronizer ring is known from WO 2010/130442 A2. In this synchronizer ring, which is manufactured by forming a flat material of metal, the conical friction surface is provided with grooves which are produced by axially shifting a tool relative to the friction surface.

It is the object of the invention to further improve the known manufacturing method or the synchronizer ring fabricated therewith.

SUMMARY

The invention provides a method comprising the following steps, which preferably are carried out in the indicated order:
  a) Producing a conical friction surface, in particular by forming, i.e, reshaping, a flat material of metal;
  b) Incorporating axial grooves into the friction surface by chipless machining, wherein a tool is axially shifted relative to the friction surface to produce the final friction surface;
  c) Vibratory grinding of at least of the friction surface; and
  d) Subsequent hardening at least of the friction surface, in particular by nitriding.

Since the grooves, as viewed in the axial direction, extend straight and not obliquely to the axial direction, i.e. have no component extending in circumferential direction, they are very easy to produce, namely by purely axially shifting a tool relative to the conical friction surface, which at this time does not yet have any axial grooves. The chipless incorporation of the grooves preferably is effected directly during or immediately after the production of the conical friction surface, in particular by forming a flat material. This results in a particularly economic manufacturing method for the synchronizer ring. Vibratory grinding of the friction surface, which is effected after incorporating the axial grooves, and the subsequent hardening of the friction surface have a positive influence on the performance of the synchronizer ring. In particular, an increased overload capacity and the capability for an increased sliding speed are achieved thereby. What is particularly advantageous here is the absence of burrs obtained by vibratory grinding and the production of a flat homogeneous surface in frictional contact, which reduces the seizing tendency, in particular under overload. Vibratory grinding is also called "vibratory finishing" and is a type of mass finishing manufacturing process used to deburr, radius, descale, burnish, clean, and brighten a large number of workpieces. In this batch-type operation, specially shaped pellets of media and the workpieces are placed e.g. into the tub of a vibratory tumbler. The tub of the vibratory tumbler and all of its contents are then vibrated. The vibratory action causes the media to rub against and grind the workpieces which yield the desired result. Depending on the application this can be either a dry or wet process. Vibratory grinding or finishing is described in DIN 8589.

Unlike tumbling this process can finish internal features, such as holes. It is also quicker and quieter. The process is performed in an open tub so the operator can easily observe if the required finish has been obtained Although to achieve said advantages it is sufficient to treat the friction surface by vibratory grinding and hardening, the entire synchronizer ring preferably is treated correspondingly for procedural reasons.

The flat material in particular is an uncoated material, so that the friction surface likewise remains uncoated. In addition, however, it would also be possible to use flat material in the form of a clad, in particular roll-clad sheet, in which it would not be necessary either to apply a separate friction lining after producing the cone. In the case of the clad sheet it is recommendable for example to provide brass as a thin surface.

Since the synchronizer ring or at least its friction surface finally is hardened, nitridable steels preferably are used as materials. An example for the flat material are C30 to C35 steels as well as 16MnCr5.

To avoid any additional method steps such as roller-burnishing or the like, all grooves preferably extend exclusively axially when viewed in the axial direction, i.e. without extending in circumferential direction.

A preferred embodiment provides that the friction surface is produced by deep-drawing and the grooves are incorporated into the friction surface by using a correspondingly profiled deep-drawing tool for deep-drawing. This is easy to perform in particular when producing an internal cone, as here a correspondingly profiled deep-drawing punch can be used.

According to a particularly advantageous aspect, the grooves each include two side walls which extend obliquely to each other as seen in radial section. This means that the side walls include an acute angle with each other. Such grooving with side walls extending obliquely to each other is particularly easy to fabricate.

The grooves need not necessarily be uniformly distributed around the circumference, and it can very well be advantageous to non-uniformly distribute the same on the circumference.

During vibratory grinding, the edges of the grooves preferably are rounded, whereby positive tribological effects are caused.

After vibratory grinding, as experiments have shown, the edges preferably should have an edge radius in the range from 0.01 mm to 0.2 mm, in particular in the range from 0.02 mm to 0.1 mm, as seen in radial section.

According to an advantageous development of the invention, an oblong axial depression is incorporated into the friction surface between two grooves, whose depth is smaller than the depth of the grooves. These axial depressions serve as microreservoirs for transmission oil and have a positive influence on the tribological properties of the synchronizer ring. Again, this also leads to a reduction of the seizing tendency and provides for a higher sliding speed.

Preferably, these depressions extend parallel to the adjacent grooves along the entire axial length of the synchronizer ring.

Even if this development offers advantages in particular in combination with the method according to the invention, it can very well be used as part of an independent invention. It would be conceivable, for example, to provide said axial depressions in a synchronizer ring in which the friction surface is not vibration-ground. This separate idea can of course be optimized further by features of the sub-claims.

The depth of the depressions preferably maximally is 20% of the depth of the adjacent grooves, so that the depressions cannot be regarded as separate grooves.

Optionally, depressions can be present between all adjacent grooves.

According to a preferred embodiment, the depressions have a substantially trapezoidal cross-section as seen in radial section. "Trapezoidal" of course also relates to a cross-section with edges rounded by vibratory grinding.

A particularly economic manufacturing method is obtained when the depressions are produced directly when incorporating the grooves into the friction surface, in particular by upsetting the wall portion forming the friction surface. When incorporating the grooves, material throw-ups thus are obtained, whereby an oblong depression is formed between two grooves. For this purpose, in particular the grooving tool need not provide a special profile.

Within the range of manufacturing tolerances, the grooves preferably have the same depth, which optionally also can be the same along the entire axial length.

The above-mentioned object likewise is solved by a synchronizer ring as mentioned above, in which the edges of the grooves are rounded by vibratory grinding, wherein vibratory grinding is effected before hardening the friction surface. The synchronizer ring according to the invention has a particularly high performance, an increased overload capacity and the capability for an increased sliding speed. By rounding the edges, positive tribological effects are caused. Since the synchronizer ring according to the invention largely is free of burrs and has a flat, homogeneous surface in frictional contact, the seizing tendency under overload is reduced. In addition, the synchronizer ring according to the invention is characterized by a simple, inexpensive manufacture. By means of microscopic analysis it can be determined whether a ring was grinded before or after hardening.

According to a development of the synchronizer ring according to the invention, the friction surface includes an oblong axial depression between two adjacent grooves, whose depth is smaller than the depth of the grooves, in particular amounts to maximally 20% of the depth of the grooves. This axial depression serves as microreservoir for the transmission oil and likewise improves the tribological properties of the synchronizer ring, wherein this development, as mentioned already, also can be regarded as an independent invention.

As already explained above, the synchronizer ring according to the invention in particular is a blocker ring with radially protruding blocking teeth. These blocking teeth are an integral part of the synchronizer ring and are produced by forming. The blocking teeth can be produced already before forming, e.g. by punching the flat material, so that subsequently no more machining aftertreatment is required in the region of the blocking teeth. The synchronizing blocker ring according to the invention hence consists of one part only.

In addition, all developments and advantages mentioned with respect to the method according to the invention also apply for the synchronizer ring according to the invention and vice versa.

DETAILED DESCRIPTION

Figure 1:
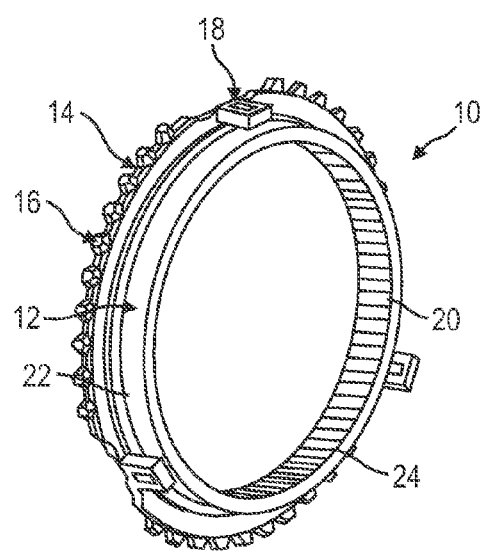
FIG. 1 shows a perspective view of a synchronizer ring according to the invention.

FIG. 1 shows a synchronizer ring 10 in the form of a blocker ring or blocking synchronizer ring. The same includes a ring body 12 from which several blocking teeth 16 protrude at an axial end 14. The blocking teeth 16 are part of a collar pointing radially to the outside.

This collar can be provided with so-called index cams 18, which as tabs originally protruding radially to the outside are axially bent by about 90°. These index cams 18 are located between adjacent groups of blocking teeth 16.

The synchronizer ring 10 is a so-called single-cone synchronizer ring with a conical friction surface 20 on the inside of the ring body 12. Such synchronizer ring 10 is used for a so-called internal synchronization.

Alternatively or in addition, the radially outer shell surface 22 also can be designed conical and form a friction surface, whereby an intermediate ring for a so-called double-cone system is obtained.

Figure 2:
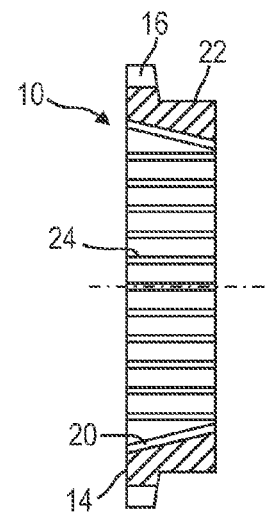
FIG. 2 shows a sectional view of the synchronizer ring of FIG. 1.

The conical friction surface 20 is provided with numerous axial grooves 24 succeeding each other very closely on its circumference, whose width substantially is equal to the distance between two adjacent grooves 24. In FIGS. 1 and 2, the distances between two adjacent grooves 24 are shown larger than is the case in the preferred embodiment, in order to preserve clarity.

The grooves 24 exclusively extend in purely axial direction with a view in axial direction, i.e. there is no extension in circumferential direction. The grooves of course also extend in radial direction.

According to the preferred embodiment, the conical friction surface 20 consists of the material of which the entire synchronizer ring 10 is made and is designed without a friction layer applied thereto. This means that the friction surface 20 is formed by the flat material of which the entire synchronizer ring 10 is made. In operation, the grooves 24 prevent welding to a counter-cone ring and represent a receiving space for oil.

Figure 3:
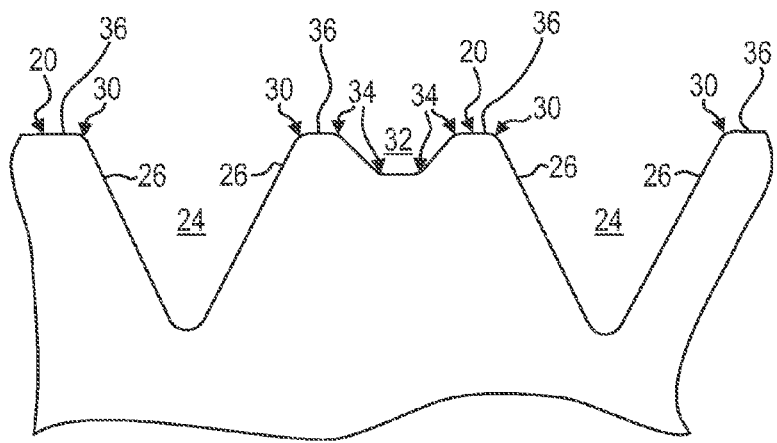
FIG. 3 shows a greatly enlarged section of the friction surface of the synchronizer ring of FIGS. 1 and 2 in a radial sectional view.

As can be taken from FIG. 3, each of the grooves 24 has two side walls 26, which as seen in radial section extend obliquely to each other, i.e. at an acute angle. In addition, at least the edges 30 of the grooves 24 arranged at the friction surface 20 are rounded by vibratory grinding, wherein as seen in radial section the edges have an edge radius in the range from 0.01 mm to 0.2 mm, in particular in the range from 0.02 mm to 0.1 mm.

Between two adjacent grooves 24 (preferably between all grooves) an oblong axial depression 32 is incorporated into the friction surface 20, whose depth is distinctly smaller than the depth of the grooves 24, in particular amounts to maximally 20% of the depth of the grooves 24. As seen in radial section, these axial depressions 32 have a substantially trapezoidal cross-section, which likewise has rounded edges 34, and are arranged approximately centrally in the wall portions 36 forming the friction surface 20, which lie on a cone surface.

Figure 4:
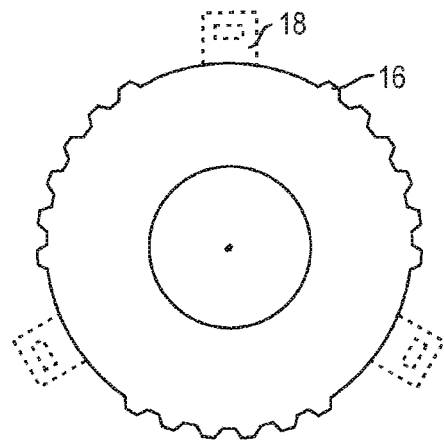
FIG. 4 shows a view of a flat material of metal, out of which the synchronizer ring according to the invention is formed.

The manufacture of the synchronizer ring 10 will be explained below with reference to FIGS. 4 to 6. The synchronizer ring 10 is manufactured from a flat material of metal, which is shown in FIG. 4 and is treated on the outside and on the inside, e.g. by punching. As after punching no machining aftertreatment preferably takes place, the blocking teeth 16 also are formed already in the flat material of metal. Optionally, index cams 18 can of course also be punched out. As flat material, in particular 16MnCr5 or C30 to C35 steel is used, wherein the steel preferably is nitridable.

The synchronizer ring 10 subsequently is plastically formed to its final geometry shown in FIG. 1, preferably by deep-drawing and without machining treatment.

Figure 5:
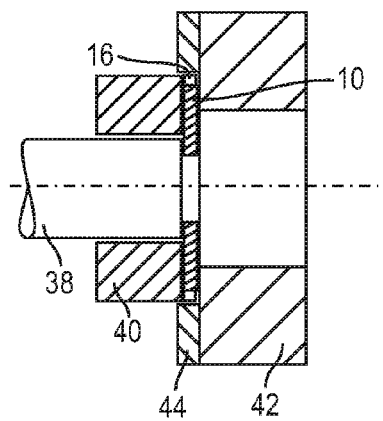
FIGS. 5 and 6 show succeeding steps during forming of the flat material for producing the synchronizer ring according to the invention, with reference to which the method according to the invention will be explained.
Figure 6:
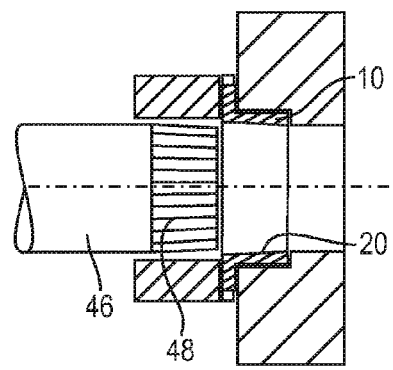

The first deep-drawing step is schematically shown in FIG. 5, in which a deep-drawing tool with a drawing punch 38, a hold-down clamp 40 and a drawing die 42 is used. There is furthermore provided a receptacle 44 which can also be part of the drawing die 42.

After several forming operations, a tool 46 in the form of a particular drawing punch finally is used (see FIG. 6), which has a conical end with ribs and grooves 48. By axially shifting the tool 46 relative to the almost finished synchronizer ring 10, the grooves 24 are formed into the friction surface 20 without cutting. The grooves 24 can of course also be produced in several forming steps.

Between two grooves 24 an oblong axial depression 32 (see FIG. 3) is incorporated into the friction surface 20. The depressions 32 are produced directly when incorporating the grooves 24 into the friction surface 20, in particular by upsetting the wall portion 36 forming the friction surface 20.

Both the grooves 24 and the axial depressions 32 hence are made during deep-drawing itself or directly subsequent thereto.

After the synchronizer ring 10 has received its final shape, at least the friction surface 20, but preferably the entire synchronizer ring 10, is vibration-ground. In the process, the edges 30 of the grooves 24 as well as the edges 34 of the axial depressions 32 are rounded.

Subsequently, the synchronizer ring 10 is hardened by nitriding at least in the region of the blocking teeth 16 and the friction surface 20.

A machining aftertreatment after producing the grooves 24 and after hardening incidentally is not effected.

The invention claimed is:

1. A method for manufacturing a synchronizer ring for synchronized manual transmissions, characterized by the following steps:
    a) producing a conical friction surface; which occurs before
    b) incorporating axial grooves having edges and a depth into the friction surface by chipless machining wherein a tool is axially shifted relative to the friction surface to produce a final friction surface; which occurs before
    c) vibratory grinding of at least the friction surface; and
    d) subsequent hardening of at least the friction surface after vibratory grinding of at least the friction surface.

2. The method according to claim 1, wherein hardening in achieved by nitriding.

3. The method according to claim 1, wherein producing the conical friction surface is achieved by reshaping a flat material of metal.

4. The method according to claim 1, wherein at least one of the grooves extends only axially when viewed in the axial direction.

5. The method according to claim 4, wherein all grooves only extend axially as when viewed in the axial direction.

6. The method according to claim 1, wherein the friction surface is produced by deep-drawing wherein the grooves are incorporated into the friction surface by using a correspondingly profiled deep-drawing tool for deep-drawing.

7. The method according to claim 1, wherein the grooves each include two side walls which extend obliquely to each other as seen in radial section.

8. The method according to claim 1, wherein during vibratory grinding the edges of the grooves are rounded.

9. The method according to claim 8, wherein after vibratory grinding the edges have an edge radius in the range from 0.01 mm to 0.20 mm.

10. The method according to claim 9, wherein after vibratory grinding the edges have an edge radius in the range from 0.02 mm to 0.10 mm, as seen in radial section.

11. The method according to claim 1, wherein an oblong axial depression is incorporated into the friction surface between two adjacent grooves, whose depth is smaller than the depth of the grooves.

12. The method according to claim 11, wherein oblong axial depressions are incorporated into the friction surface between all adjacent grooves.

13. The method according to claim 11, wherein the depression has a substantially trapezoidal cross-section as seen in radial section.

14. The method according to claim 11, wherein the depression is produced directly when incorporating the grooves into the friction surface.

15. A method for manufacturing a synchronizer ring for synchronized manual transmissions according to claim 1, characterized by the following steps:
    a) producing a conical friction surface; which occurs before
    b) incorporating axial grooves having edges and a depth into the friction surface by chipless machining wherein a tool is axially shifted relative to the friction surface to produce a final friction surface; which occurs before c) incorporating an oblong axial depression into the friction surface between two adjacent grooves, whose depth amounts to maximally 20% of the depth of the grooves; which occurs before
d) vibratory grinding of at least the friction surface; and
e) subsequent hardening of at least the friction surface after vibratory grinding of at least the friction surface.

16. A method for manufacturing a synchronizer ring for synchronized manual transmissions s according to claim 1, characterized by the following steps:

a) producing a conical friction surface; which occurs before
b) incorporating axial grooves having edges and a depth into the friction surface by chipless machining wherein a tool is axially shifted relative to the friction surface to produce a final friction surface; which occurs before
c) incorporating an oblong axial depression into the friction surface between two adjacent grooves, whose depth is smaller than the depth of the grooves, wherein the depression is produced directly when incorporating the grooves into the friction surface by upsetting a wall portion forming the friction surface; which occurs before
d) vibratory grinding of at least the friction surface; and
e) subsequent hardening of at least the friction surface after vibratory grinding of at least the friction surface.

* * * * *